Aug. 12, 1930. E. A. SPERRY, JR 1,772,788
AUTOMATIC PILOT
Filed April 26, 1927  2 Sheets-Sheet 2
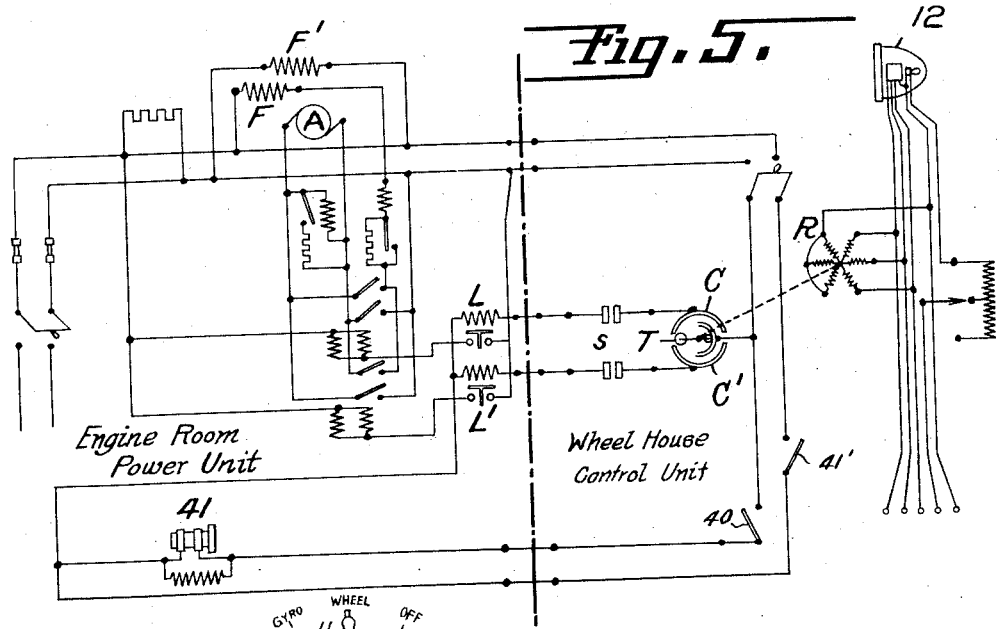
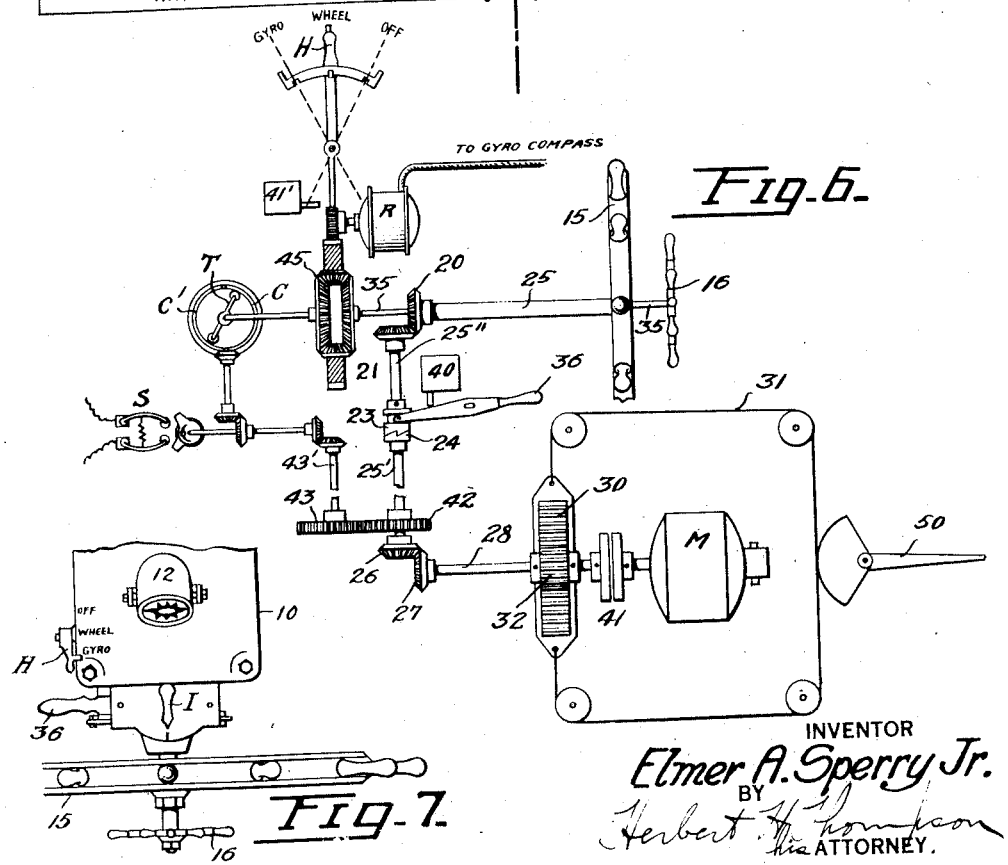
INVENTOR
Elmer A. Sperry Jr.
BY Herbert H. Thompson
his ATTORNEY.

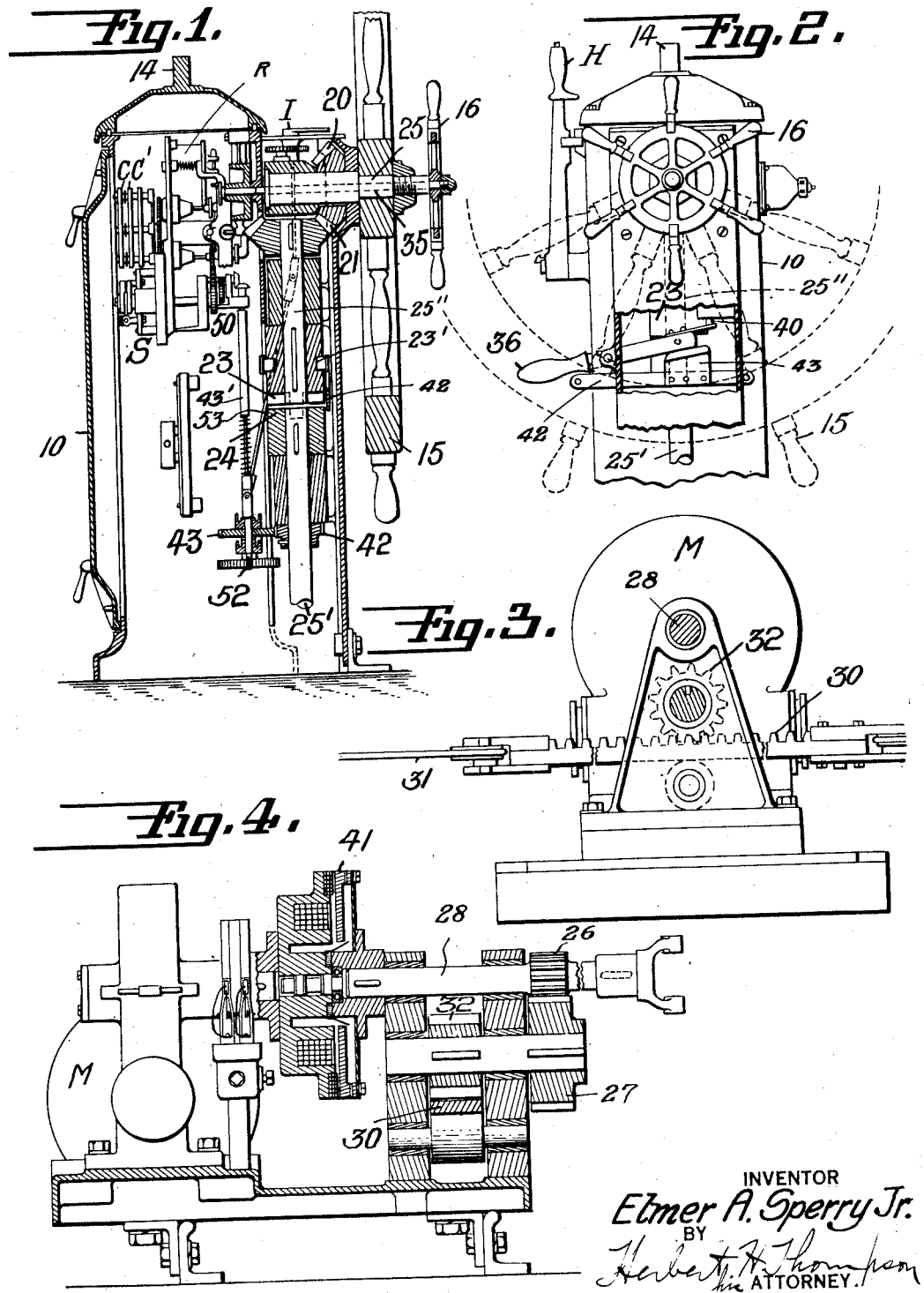

Patented Aug. 12, 1930

1,772,788

UNITED STATES PATENT OFFICE

ELMER A. SPERRY, JR., OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

AUTOMATIC PILOT

Application filed April 26, 1927. Serial No. 186,645.

This invention relates to combined hand and automatic steering devices whereby a craft may be selectively placed under control of a helmsman or of a gyroscopic compass. The invention is particularly adapted for use upon craft, such as yachts of 150 to 200 foot length, for example, which can with some physical effort be steered by hand, and in which the usual heavy steering engines and telemotors are not employed, there being a direct mechanical connection between the steering wheel and the rudder. This invention provides means for relieving the helmsman of this heavy task by providing a wholly automatic steering device which is also adapted for manual steering through a servomotor system, which device, however, can be rendered ineffective at will to permit direct manual steering. It is an object of this invention to provide means for automatically rendering the automatic steering control ineffective when the hand control is rendered effective.

Other objects and advantages of this invention will be pointed out in the following detailed description thereof.

In the accompanying drawings—

Fig. 1 is a vertical section through a steering control mechanism embodying my invention and normally placed forward in the wheel or pilot house.

Fig. 2 is a partial front elevation of the Fig. 1 device with parts thereof broken away to indicate underlying structure.

Fig. 3 is an elevation of the rudder steering engine normally placed aft near the rudder.

Fig. 4 is an elevation, partly sectioned vertically, taken at right angles to the Fig. 3 view.

Fig. 5 is a wiring diagram.

Fig. 6 is a diagrammatic view showing the mechanical inter-connections between the elements shown in Figs. 1, 2 and 4 and the rudder.

Fig. 7 is a top plan view of Fig. 2 showing also the repeater compass in place on top of the stand.

Referring to the drawings, I have disclosed a steering controller comprising a casing 10 within which is contained the control mechanism to be described more in detail hereinafter. Upon the outside of casing 10 is mounted the usual steering repeater 12 shown in Figs. 5 and 7 and adapted to be set upon vertical post 14. On the outside of said casing is also mounted the hand steering wheel 15 on hollow shaft 25 having direct mechanical connection with the rudder. A hand electric wheel 16 is mounted concentrically with wheel 15 on an inner shaft 35. The hand drive from wheel 15 may include bevel gear 20 on shaft 25 and bevel gear 21 on shaft 25″ which may be connected to an operating shaft 25′ by means including the clutch 23—24. Said shaft 25′, or an extension 28 thereof, may have gearing connection 26, 27 and 32 with rack 30 for operating a pulley system 31 connected to the rudder. There is thus effected a direct mechanical drive from hand wheel 15 to the rudder and vice versa.

I may also employ an automatic steering connection which may include the electric motor M having the same gearing connection 32 to said rack 30. Said electric motor may be controlled by a contact and trolley arrangement shown in Figs. 1, 5 and 6, the contacts being indicated by the letters C—C′ and the trolley by T. The contact rings C—C′ are indicated in Fig. 1 but the trolley is not visible in said figure. The said trolley may be controlled automatically from a gyroscopic compass through a repeater motor R controlled from said compass so that deviation of the craft from its course causes trolley T to engage contact C or contact C′ to energize reversible motor M in one direction or the other to operate the rudder 50 in a direction to return the craft to its course.

I provide also a hand electrical control in the form of the wheel 16 for changing course while the automatic steering control is in operation or for independent electric steering without automatic control. Said wheel is mounted on a shaft 35 as described above and has engagement at its inner end through suitable differential connections 45 to the trolley T so that said trolley may be moved into engagement with contact C or C′ by hand operation of wheel 16. Said wheel and the repeater motor R are connected respectively to two arms of differential 45, the third arm being connected to the trolley T of the controller (see Fig. 6). Such differential connection is shown in my prior application now Patent No. 1,695,615 dated December 18, 1928, for automatic steering, and also in my prior application No. 713,711, filed May 16, 1924.

For permitting the various drives hereinbefore described to operate without interfering with each other, I provide suitable clutches for rendering other drives ineffective when one of said drives is rendered effective. Thus, for example, to render the direct hand drive from wheel 15 ineffective, I provide a lever 36 having a pin and fork engagement with a groove 23' of part 23 of the clutch so that by rocking said lever clutch part 23 may be raised out of engagement with clutch part 24 as shown in Fig. 1 to render the direct hand drive ineffective. To hold said clutch part elevated or in the disengaged position I have shown a slide 42 having a cam surface 43 which is pulled outwardly when the clutch is raised to wedge the cam under an arm of the fork. To release the clutch the operator merely pushes in slide 42 and thus allows clutch member 23 to drop of its own weight into engagement with clutch member 24. At the same time I cause this action to render the electric drive effective by causing said lever 36 when actuated to release clutch 23—24 to operate a contact closer 40 (see Fig. 2) to close the circuit through an electro-magnetic clutch 41, which clutches the electric motor M to shaft 28 and hence to the rack 30. The rudder will now be driven from the steering engine in the form of said motor M.

To determine whether said motor M shall be controlled automatically from the gyro compass through repeater R or alone by the hand electric drive wheel 16, I provide a controller handle H having three positions, the first of which is "off" to render the motor ineffective by opening the circuit at switch 41' (Fig. 6); the second is "hand" which permits control of motor M solely through hand wheel 16 by locking the repeater motor; and the third of which is "gyro" to permit automatic control of the motor M from the gyroscopic compass, but which also allows course changes to be effected through the hand wheel 16. This double function of handwheel 16 and certain other features are shown, as above stated, in my prior application and are not claimed herein as new per se, the broader claims being retained in the earlier filed application.

It should be noted that even though the clutch connection 23—24 is broken, that shaft 25' will still turn if the rudder is turned, although the main handwheel 15 will not turn since shaft 25' is directly connected with shaft 28. This shaft, therefore, is not only employed as a direct drive from the handwheel 15 to the rudder but also serves as a follow-back drive from the rudder when the handwheel is not operating. For this purpose, from shaft 25' there may be operated through suitable gearing 42—43 a shaft 43' and gearing indicated generally at 50, limit switches indicated generally at S, and a suitable follow-up connection to the contact segments C—C' to cause the segments C—C' to follow the movements of the trolley T as the rudder is turned. An indicator I mounted on top of the casing 10 may be actuated through suitable gearing indicated generally at 52 and a shaft 53 from the shaft 25' to give an indication of the degree of actuation of the rudder.

Various control mechanism described hereinbefore as contained within casing 10 is not set forth in detail because the details are not essential to the understanding of the principle of this invention, and are moreover fully set forth in my aforesaid Patent No. 1,695,615 and application No. 713,711. The wiring diagram of Fig. 5 discloses that the repeater 12 normally mounted on post 14 at the upper end of casing 10 is operated from the gyro compass, as is also repeater R which controls trolley T with respect to contacts C—C'. Said contacts control relays L—L', which in turn control other relays to energize the armature A and the fields F and F' of the motor to drive it in one direction or the other. The electro-magnetic clutch is indicated diagrammatically at 41 in said figure.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A steering mechanism for dirigible craft having a rudder and a forward control unit comprising, a hand steering drive including a steering wheel and a direct mechanical connection including a hand clutch between said wheel and said rudder, a controller in said unit, an electric steering drive including a motor adjacent the rudder and an electro-magnetic clutch adapted to connect and disconnect the motor and rudder, and means whereby operation of said hand clutch to render said hand steering drive effective and ineffective renders said electro-magnetic clutch ineffective and effective respectively.

2. A steering mechanism for dirigible craft having a rudder, and a forward control unit comprising, a hand steering drive including a steering wheel and a direct mechanical connection including a hand clutch between said wheel and said rudder, a controller in said unit, an electric steering drive including a motor adjacent the rudder and an electro-magnetic clutch adapted to connect and disconnect the motor and rudder, a circuit breaker in the circuit of said electro-magnetic clutch, and means whereby operation of said hand clutch to render said hand steering drive effective and ineffective actuates said circuit breaker to render said electro-magnetic clutch ineffective and effective respectively.

3. A triple steering mechanism for dirigible craft having a rudder and a compass, a forward control unit comprising a hand steering drive including a steering wheel and a direct mechanical connection between said wheel and said rudder, an electric controller in said unit, an electric steering drive including a motor adjacent the rudder, means in said controller whereby said electric drive may be controlled by hand or automatically from said first-named compass, and means for rendering said hand steering drive effective and ineffective and said electric drive simultaneously ineffective and effective.

4. In a combined manual and electric steering device for ships, a forward unit comprising an electrical controller, hand controlled means for governing said controller, follow-up means on said controller, a pilot wheel, an aft unit comprising an electric motor for driving the rudder, an electro-magnetic clutch for connecting and disconnecting said motor and rudder, a mechanical connection from said pilot wheel to said rudder, and means for driving said follow-up means from said connection.

5. In an automatic steering device for ships, a forward unit comprising an electrical controller, compass controlled means for governing said controller, follow-up contacts on said controller, a pilot wheel, an aft unit comprising an electric motor for driving the rudder, an electro-magnetic clutch for connecting and disconnecting said motor and rudder, a mechanical connection from said pilot wheel to said rudder, means for driving said follow-up contacts from said connection, and a clutch adjacent said wheel for breaking said connection and bringing said electro-magnetic clutch into operation.

6. In an automatic steering device for ships, a forward unit comprising an electrical controller, alternative compass controlled means and manual means for governing said controller, follow-up contacts on said controller, a pilot wheel, an aft unit comprising an electric motor for driving the rudder, an electro-magnetic clutch for connecting and disconnecting said motor and rudder, a mechanical connection from said pilot wheel to said rudder, and means for driving said follow-up contacts from said connection.

7. In an automatic steering device for ships, a forward unit comprising an electrical controller, compass controlled means for governing said controller, follow-up contacts on said controller, a pilot wheel, an aft unit comprising an electric motor for driving the rudder, an electro-magnetic clutch for connecting and disconnecting said motor and rudder, a mechanical connection from said pilot wheel to said rudder, a rudder angle indicator on said forward unit, and means for driving said follow-up contacts and said rudder angle indicator from said connection.

In testimony whereof I have affixed my signature.

ELMER A. SPERRY, Jr.